Oct. 1, 1968 C. H. FOX ET AL 3,403,746
FLEXIBLE DRIVE FOR TRACTOR-TYPE PRIME MOVER
Filed April 26, 1966 2 Sheets-Sheet 1
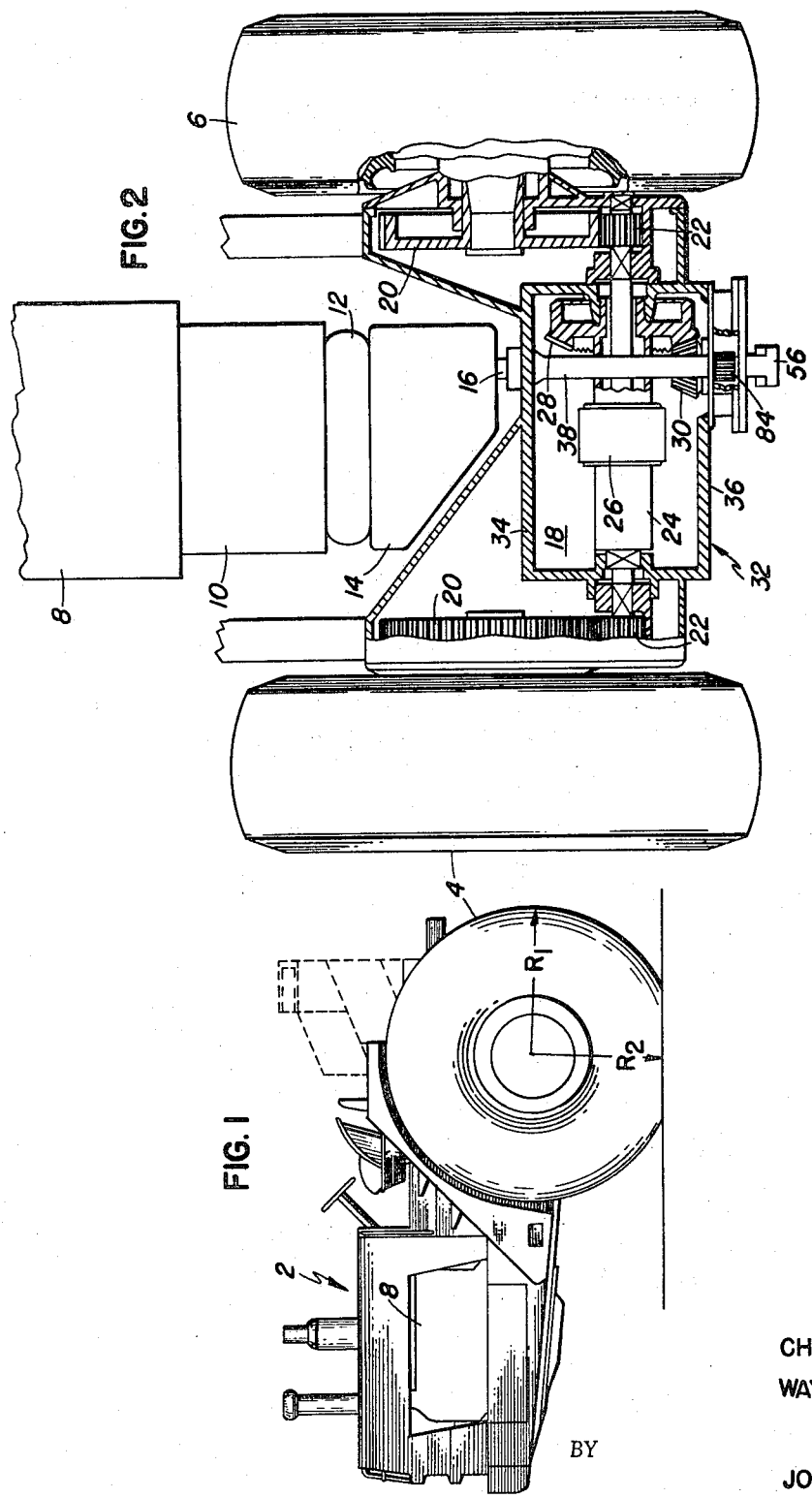
INVENTORS
CHARLES H. FOX
WAYNE H. McGLADE
BY
JOHN F. SCHMIDT
ATTORNEY

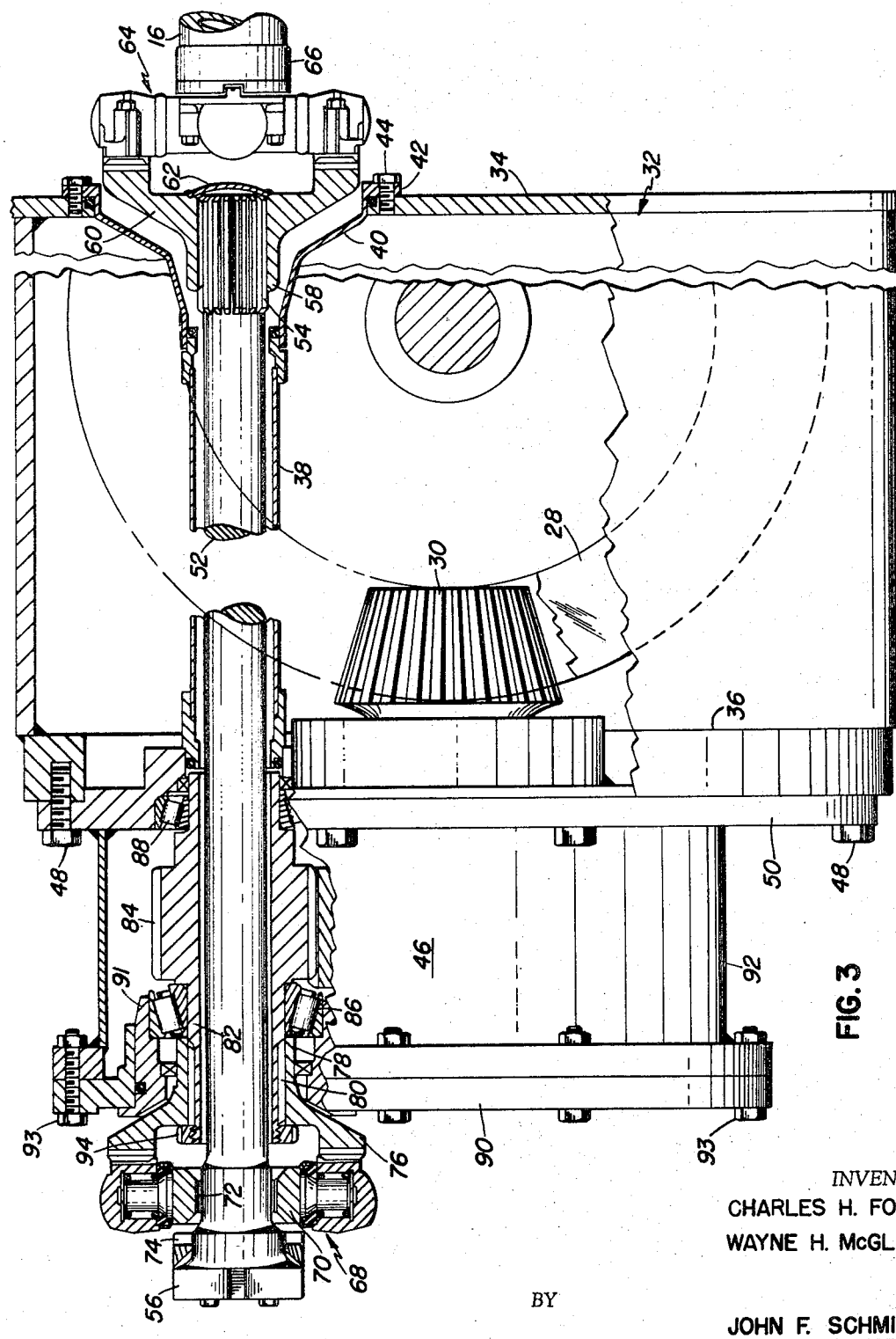

United States Patent Office 3,403,746
Patented Oct. 1, 1968

3,403,746
FLEXIBLE DRIVE FOR TRACTOR-TYPE
PRIME MOVER
Charles H. Fox, Washington, and Wayne H. McGlade,
Peoria, Ill., assignors to Westinghouse Air Brake Company, a corporation of Pennsylvania
Filed Apr. 26, 1966, Ser. No. 545,398
14 Claims. (Cl. 180—70)

ABSTRACT OF THE DISCLOSURE

In a tractor-type prime mover including a power package and drive wheels, a torsionally flexible draft shaft encompassed by a tubular envelope positioned operatively between a tractor engine, variable speed transmission and the final drive thereof, the flexible drive shaft extending through the final drive housing and including universal joint means on either end thereof whereby shock loads from the drive wheels are insulated from the tractor engine and transmission.

This invention pertains to a flexible drive, and especially to a flexible drive such as may be encountered in a two-wheel, rubber-tired prime mover in which substantial fluctuations in speed and load may be encountered.

In two-wheel, rubber-tired prime movers of the type generally illustrated in U.S. Patents 2,454,070 and 2,557,444, issued to R. G. LeTourneau on Nov. 16, 1948, and June 19, 1951, respectively, problems are sometimes encountered in the transmission of power or torque from the power package to the drive wheel or wheels of the prime mover. Prime movers of the type shown in the above-identified patents rely entirely on tire deflection for the absorption of shock occasioned by roughness of terrain, load shocks, and the like. As the tires deflect, the effective radius of the wheel changes. Moreover, the power package itself is inherently subject to variations in the torque output; for example, internal combustion engines provide output torque in pulsations which are spaced according to the firing of the individual cylinders. Furthermore, the load changes because of changes encountered in the towed implement as it moves through earth of varying consistency. The above-identified and other variables impose rather severe strains on the power train of a prime mover of the type indicated, strains which can result in failure of critical elements and consequent downtime for the equipment in question. The result may be customer dissatisfaction, and loss of business to the manufacturer of the equipment.

It is accordingly an object of this invention to provide a flexible drive in a power train for equipment of the general type described and illustrated in the above-identified patents in which torsional flexibility of the drive gives the equipment the ability to absorb shocks without damage to critical elements in the power train.

This and other objects are accomplished in a limited space by incorporating a long shaft having sufficient angular flexibility to yield elastically in torsion to an extent that suffices to absorb shocks which would otherwise be transmitted by the power train and would result in premature failure of certain elements.

In the drawings:

FIG. 1 is a side elevation view of a prime mover of the type indicated in the two LeTourneau patents identified above.

FIG. 2 is a largely schematic view from the top, of the prime mover shown in FIG. 1, with parts broken away and in section, and on a larger scale than the view shown in FIG. 1, and FIG. 3 is a vertical section through the power train of the prime mover shown in FIG. 2, and on a larger scale than that of FIG. 2.

Referring now to the drawings in detail, a two-wheel prime mover is indicated generally at 2. It will be understood by those skilled in the art that the prime mover here shown is adapted to cooperate with a towed vehicle which is itself carried on two wheels, the prime mover and the trailing vehicle being joined by any suitable hitch mechanism, not shown here because it forms no part of this invention. Examples of tractor-trailer units of this general type are shown in Patents 2,368,202, 2,400,868, and 3,110,118, to G. I. Clark, R. G. LeTourneau and W. E. Lott, issued Jan. 30, 1945, May 28, 1946, and Nov. 12, 1963, respectively.

The prime mover 2 is equipped with two wheels on which are mounted rubber tires 4 and 6. As can be seen in FIG. 1, the tires deflect substantially between a maximum radius $R_1$ and a considerably shorter radius such as that shown at $R_2$. Moreover, the radius $R_2$ is a variable, changing almost constantly as the equipment moves, resulting in rather substantial speed and torque changes in the power train which drives the wheels. It will of course be understood that the radius $R_1$ represents a limiting condition because it is substantially the radius of the tire in its free or unloaded condition. The radius $R_2$, being the radius of the tire when loaded, can momentarily be equal to $R_1$, as when the wheel is free of the road surface; this condition can occur when the prime mover bounces during its relatively high speed forward motion on a relatively uneven or rough road.

The prime mover carries a power package which conventionally, in equipment of the type made and sold by the assignee of this invention, includes an internal combustion engine 8 connected through an electric alternator 10, a torque converter 12, and a change-speed transmission 14 with any suitable power output device such as a shaft 16.

Equipment of the type here contemplated is desirably extremely compact to provide a high degree of maneuverability, such as a small space within which the tractor-trailer may be turned around. To keep the turning space requirements to a minimum, the overhang, or portion of the prime mover projecting ahead of the wheels, should be kept to a minimum. The result of such space limitations is a prime mover in which the power package is closely adjacent to the wheel drive.

The closely spaced relationship of these elements is best seen in FIG. 2, where the power output device 16 is shown as being closely adjacent to a final drive assembly indicated generally at 18. The final drive assembly includes means drivingly connected with at least one wheel of the prime mover. In the embodiment shown, both wheels 4 and 6 are driven through a direct connection with bull gears 20, pinion gears 22, and drive axle 24 wherein a torque proportioning differential 26 is provided preferably of the type shown in Patent 2,415,293, issued Feb. 4, 1947, to R. G. LeTourneau.

A bevel ring gear 28 is mounted on the drive axle 24 and meshes with a bevel pinion gear 30. Thus the bevel pinion 30 qualifies as means drivingly connected with at least one wheel of the prime mover, as recited in the claims.

The final drive assembly 18 includes an enclosure 32 having a wall 34 closely adjacent the power output device 16. This closely spaced relationship of the parts is also shown in FIG. 4 of the above-identified Patent 2,454,070 and in FIG. 2 of the above-identified Patent 2,557,444. In each of those patents, the power output device is directly connected with the bevel pinion. Because of the closely coupled relationship of the elements in the connection provided in the two above-identified patents just referred to, such a connection provides a drive shaft of substantially zero length, with the result that there is no shaft to deflect angularly to absorb the speed and torque variations which occur in prime movers of this type.

(It may be pointed out parenthetically here that the rotating parts in the final drive assembly are conventionally journaled in suitable bearings as indicated by conventional symbols in Patents 2,454,070 and 2,557,444, referred to above. The bearings and journals form no part of this invention and thus are indicated by conventional symbols instead of being shown in detail.)

Because of the closely spaced relationship of power output device 16 and final drive assembly 18, space for a drive shaft long enough for torsional flexibility is provided by arranging for the shaft to traverse the final drive assembly, connecting therewith at the point farthest away from power output device 16 instead of the point closest to the power output device. In the preferred embodiment shown, the torsionally flexible drive shaft traverses the final drive assembly by passing through the enclosure 32.

More specifically, wall 34 of enclosure 32 which is closest to power output device 16 is provided with an opening to receive the drive shaft, and an aligned opening is provided in the opposite wall 36. Thus, as can best be seen in FIG. 3, a tubular envelope 38 connects the two openings in these opposite walls, being secured in wall 34 by means of a bell shaped element 40 having a flange 42 through which threaded members 44 pass to engage threaded openings in wall 34. The opening in wall 36 provided to receive the opposite end of tubular envelope 38 is part of a larger opening which accommodates a gear reduction assembly indicated generally at 46, assembly 46 being secured to enclosure 32 by means of threaded members 48 passing through a flange 50 and engaging threaded openings in the wall 36.

A torsionally flexible drive shaft 52 traverses the final drive assembly by passing through the tubular envelope 38. Shaft 52 has a first end 54 closely adjacent to power output device 16 and a second end 56. The power train includes means drivingly connecting power output device 16 with said first end 54 of shaft 52. For that purpose, end 54 is externally splined as shown in FIG. 3 to cooperate with internal splines in the hub 58 of a yoke 60. A cap 62 is preferably provided over the inner end of the opening through hub 58.

Yoke 60 is one element of any suitable universal joint indicated generally at 64 having a second yoke hub 66 drivingly engaging the end of power output device 16. Universal joint 64 may be any one of a number of conventional universal joints. This invention has been used successfully with universal joints made by the Twin Disc Clutch Company having a place of manufacture at Rockford, Ill., and of a type shown in Twin Disc Bulletin 513–A and dated September 1965.

The space inside enclosure 32 is provided with lubricant. Shaft 52 runs dry inside its tubular envelope 38, and to prevent loss of lubricant by way of envelope 38, suitable conventional seals against lubricant loss are provided as needed. The seals per se form no part of the invention and thus are not discussed in detail.

Reference was made above to second end 56 of shaft 52. The illustrated preferred form of the invention shows means drivingly connecting end 56 with bevel pinion 30, pinion 30 being referred to in some of the claims as means drivingly connected with a wheel of the prime mover.

More specifically, a second universal joint indicated generally at 68 is provided as part of the drive connection between shaft end 56 and bevel pinion 30. Universal joint 68 is also of the general type shown in the above-identified Twin Disc catalog, but modified to suit the requirements of this particular application. Thus, whereas the cross of universal joint 64 is conventionally not provided with a central bore, cross 70 of universal joint 68 is provided with such a central bore, shown at 72, to allow shaft 52 to pass through the universal joint. Similarly, the yoke 74 which is secured to shaft 52 is provided with a through bore which in the preferred embodiment is necessary because shaft 52 extends all the way through the universal joint 68. In this manner, the connection at the second end 56 is different from the connection at the first end 54 where the bore through hub 58 need not be a through bore and, in fact, is not a through bore because of closure 62.

The remaining yoke 76 of universal joint 68 is provided with a hub 78 which is internally splined to receive the external splines 80 of tubular drive means 82. Tubular drive means 82 envelops a portion of shaft 52, as can be seen in FIG. 3, and carries, preferably integral therewith, a gear 84. Tubular drive means 82 is rotatably mounted in bearings 86 and 88. Bearings 86 and 88 are suitably supported in end wall or cover 90 and flange 50 respectively of the gear reduction assembly 46. More specifically, bearing 86 is mounted in an easily removable bearing cage 91; both bearing installations are suitably packed (sealed) as shown. End wall or cover 90 forms one element of an enclosure for the assembly 46 having another element 92 extending between and connecting end wall 90 and flange 50. Threaded members 93 hold end wall 90 in place on a suitable flange on element 92. An internally threaded member 94 engages external threads on tubular drive means 82 to hold hub 78 in place.

Gear reduction assembly 46 may be any one of a number of reduction gear trains suitable for the purpose here shown. Details of the gear reduction assembly form no part of the invention and thus are not shown. It suffices for the purposes of describing this invention to point out that the power output of gear reduction assembly 46 is connected with and drives bevel pinion 30.

The compactness of the power train will be apparent from the foregoing, and this compactness is perhaps best shown in FIG. 2. In that top plan view, it can be seen that enclosure 32, in the front-to-back direction, extends from a location adjacent the center portion (or axis of rotation) of drive wheels 4 and 6 to a location substantially at the back end or edge of the wheels.

As is pointed out above, the absence of a long, torsionally flexible, drive shaft in the power train disclosed in Patents 2,454,070 and 2,557,444, referred to above, results in the direct transmission of shocks, caused by load and speed changes, in both directions in the power train there disclosed. Such shocks can and do cause equipment failure which is largely eliminated in the invention disclosed and claimed herein. Shaft 52 is long enough in relation to its diameter to give it torsional flexibility, permitting elastic angular deformation of the shaft between its ends sufficient to absorb the most damaging shocks inherent in a prime mover of this type. The result is longer life of the components and less down-time for the equipment as a whole.

Broadly stated, the objective is protection of the drive train between the engine and the ground from destructive torsional impulses and interaction between the rotating masses. Desirably, the rotating masses should be isolated as nearly as practicable from all sources of torsional impulses. The two principal sources are the engine, and the reaction of the wheels to ground environment.

A suitable drive train will take into account three criteria: the drive train must be able to carry the maximum torque delivered; the entire drive line must have no major resonant frequencies within the operating speed range; and the train must not fail through shaft whip. Failure through shaft whip is prevented by keeping the first natural frequency of the train above the highest operating speed.

Within the foregoing limits, the drive line is made as torsionally flexible or "soft" as possible between the engine and the transmission, and between the transmission and the final drive. The resulting power train is one which puts a minimum of shock load on expensive components, greatly prolonging the life of those components and reducing down time and maintenance costs. Other advantages will be apparent to those skilled in the art.

While there is in this application specifically described one form which the invention may assume in practice, it will be understood that this form of the same as shown for purposes of illustration and that the invention may be modified and embodied in various other forms without departing from its spirit or the scope of the appended claims.

What is claimed is:

1. In a wheeled prime mover:
   a power package including a power output device;
   a final drive assembly adjacent said device and including means drivingly connected with at least one wheel of the prime mover;
   a torsionally flexible shaft traversing the final drive assembly and having a first end closely adjacent the power output device and a second end;
   means drivingly connecting said device and said first end;
   tubular drive means having axially spaced input and output end portions and sleeved over a portion of the shaft and adjacent said second end;
   means drivingly connecting said second end and the tubular drive means; and
   means drivingly connecting the tubular drive means and the first-named means.

2. A combination as in claim 1, wherein the last named means includes a gear reduction assembly mounted on the final drive assembly adjacent said second end of the shaft with the shaft and the tubular drive means passing through the gear reduction assembly.

3. A combination as in claim 2, wherein the means drivingly connecting the second end and the tubular drive means comprises a universal joint having a cross provided with a bore and two yokes connected at right angles to the cross, one yoke secured to the tubular drive means and having a bore and the remaining yoke secured to the shaft, with the shaft passing through said two bores.

4. A combination as in claim 3, wherein the final drive assembly includes an enclosure having a first opening closely adjacent said power output device and a second opening axially aligned with the first opening and disposed in an opposite wall of the enclosure; and a tubular envelope extending between said first and second openings, the torsionally flexible shaft passing through the envelope.

5. A combination as in claim 4, wherein the gear reduction assembly is mounted outside the enclosure on said opposite wall thereof.

6. A combination as in claim 2, wherein the final drive assembly includes an enclosure having a first opening closely adjacent said power output device and a second opening axially aligned with the first opening and disposed in an opposite wall of the enclosure; and a tubular envelope extending between said first and second openings, the torsionally flexible shaft passing through the envelope.

7. A combination as in claim 6, wherein the gear reduction assembly is mounted outside the enclosure on said opposite wall thereof.

8. A combination as in claim 1, wherein the means drivingly connecting the second end and the tubular drive means comprises a universal joint having a cross provided with a bore and two yokes connected at right angles to the cross, one yoke secured to the tubular drive means and having a bore and the remaining yoke secured to the shaft, with the shaft passing through said two bores.

9. A combination as in claim 1, wherein the final drive assembly includes an enclosure having a first opening closely adjacent said power output device and a second opening axially aligned with the first opening and disposed in an opposite wall of the enclosure; and a tubular envelope extending between said first and second openings, the torsionally flexible shaft passing through the envelope.

10. In a tractor-type wheeled prime mover including drive wheels:
   (a) a power package including a power output device;
   (b) a final drive assembly including
      (1) an enclosure extending from adjacent the center portion of said drive wheels to one end thereof, said enclosure having a first opening closely adjacent said device and a second opening,
      (2) a tubular envelope extending between said first and second openings, and
      (3) means drivingly connected with at least one wheel of the prime mover;
   (c) a torsionally flexible shaft rotatably mounted in and extending through said envelope and having a first end closely adjacent the power output device and a second end;
   (d) means drivingly connecting said device and said first end; and
   (e) means drivingly connecting said second end and the first-named means.

11. A combination as in claim 10, wherein the means drivingly connecting the second end and the first-named means comprises a universal joint having a cross provided with a bore and two yokes connected at right angles to the cross, one yoke having a bore and the remaining yoke secured to the shaft, with the shaft passing through said two bores.

12. In a tractor-type wheeled prime mover having drive wheels:
   (a) a power package including a power output device;
   (b) a final drive assembly closely adjacent said device and extending from adjacent a central portion of said drive wheels to adjacent one end thereof and including means drivingly connected with at least one wheel of the prime mover;
   (c) a torsionally flexible shaft traversing the final drive assembly and having a first end closely adjacent the power output device and a second end;
   (d) means drivingly connecting said device and said first end; and
   (e) a universal joint drivingly connecting said second end and the first-named means and comprising
      (1) a cross provided with a bore,
      (2) a yoke having a bore, and
      (3) a second yoke at right angles to the first yoke and secured to the shaft,
   with the shaft passing through said two bores.

13. In a tractor-type prime mover having at least one drive wheel:
   a power package including an engine and a change-speed transmission driven thereby;
   a final drive assembly having an enclosure comprising two axially spaced walls, one of said walls closely adjacent the transmission, and having also means drivingly connected with said drive wheel;
   a gear assembly mounted on the other of the two walls;
   a torsionally flexible shaft traversing the final drive assembly and having a first end closely adjacent the transmission and a second end;
   means drivingly connecting said first end of the shaft with the transmission;
   tubular drive means having axially spaced input and output end portions and sleeved over the second end of the shaft and disposed in the gear assembly;
   means drivingly connecting said input end portion with the second end of said shaft; and
   means drivingly connecting the output end portion of the tubular drive means and the first-named means.

14. The invention set forth in claim 13, wherein the gear assembly lies outside the final drive enclosure and the tubular drive means axially traverses said gear assembly.

References Cited

UNITED STATES PATENTS

Re. 15,919 9/1924 Holmes _____ 180—48
3,052,313 9/1962 Hooven _____ 180—70 X
3,135,529 6/1964 Conrad _____ 180—12 X

FOREIGN PATENTS 144,137 11/1951 Australia.

A. HARRY LEVY, *Primary Examiner.*